Oct. 8, 1929.    J. A. ST. CLAIR    1,730,484
TOOL FOR TREATING SAW TEETH
Filed Feb. 5, 1927
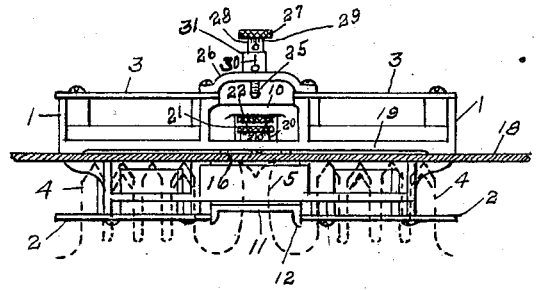
INVENTOR,
JOHN A. St. CLAIR
BY Carey S. Frye
ATTORNEY Patented Oct. 8, 1929

1,730,484

UNITED STATES PATENT OFFICE

JOHN A. ST. CLAIR, OF INDIANAPOLIS, INDIANA

TOOL FOR TREATING SAW TEETH

Application filed February 5, 1927. Serial No. 166,105.

This invention relates to tools for treating saw teeth, primarily of the cross-cut or drag variety and one feature of the invention is in so constructing the tool that a file may be secured therein and the tool used as a handle and the file manipulated for jointing or reducing all the teeth to a uniform length.

A further feature of the invention is the provision of means for setting parts of the tool whereby the drag teeth or rakers may be shortened to the proper length and in such manner that all the drag teeth will be of uniform length and each tooth the same distance below the tops of the respective groups of cutting teeth.

A further feature of the invention is the provision of means for determining to the fractional part of an inch, the amount of stock to be removed from the various teeth and the parts of the tool then locked in this position so that all teeth will be shortened to the same degree of length.

A further feature of the invention is in so constructing the frame of the tool that a substantially clear vision of the work being done will be had and the tool is of such nature that it may be used as successfully in the field or forest as when the work is being done in a shop.

Other objects and advantages will be hereinafter more fully set forth and pointed out in the accompanying specification.

In the accompanying drawing which is made a part of this application.

Figure 1 is a side elevation of the tool with parts arranged for jointing purposes.

Figure 2 is a similar view showing the parts set for determining the amount of stock to be removed from the points of the raker teeth.

Figure 3 is an elevation of the tool with parts set for determining the degree of swaging to be given the raker teeth.

Figure 4 is a transverse sectional view through the tool on an enlarged scale.

Referring to the drawing, 1 indicates the frame of the tool, which is preferably oblong and of skeleton formation, the top and bottom edges of the frame 1 having pairs of plates 2 and 3 attached thereto, which plates are preferably of hardened material so that the teeth of the saw will not cut into or wear the plates, or the teeth become dulled by engagement therewith. The plates 2, as best shown in Fig. 4 of the drawing project laterally beyond the face of the frame to provide a rest for the ends of the cutting teeth 4, as shown in Fig. 2 of the drawing, as when the raker teeth 5 are being cut down to the proper length, while the plates 3 project in the opposite direction to form a rest for the teeth 4 during the measurement of the swaging operation, as shown in Fig. 3 of the drawing.

Substantially at the longitudinal center of the frame 1 is a recess 6, in which is mounted a block 7, said block being adjustable in said recess and controlled by means of an adjusting screw 8, one end of which is fixed to the block and the opposite end projected through a cross bar 10 on the frame 1. The opposite face of the block 7 has a gauge plate 11 attached thereto, said plate having flanges 12 at its opposite ends for guiding a file, when the points of the raker teeth are being removed. One edge of the plate 11 projects beyond the edge of the block 7 and this projecting portion 13 is provided with a longitudinal slot 14, through which the tooth 5 projects when the drag or raker end thereof is being filed off. A narrow rib 15 is preferably extended along each edge of the slot 14 to prevent the file striking the face of the plate 11 during the filing operation and leaving the filed surface more even by permitting a more natural movement of the file. The plate and ribs are preferably constructed of extremely hard material so that the file will not cut away any of the face of the plate 11 or ribs 15 thereon. The block 7 is held within the recess 6 and caused to travel in a straight path in any suitable manner, preferably by means of guide posts 16, one end of the posts being attached to parts of the frame 1 and their opposite ends entered in bores 17 in the block 7.

The top portion of the block 7 is also employed for locking a file 18 in position on the frame 1, the frame having a ledge 19 along one face thereof between which and the block, the file is clamped, the adjusting screw 8 being employed for lifting the block against the file with sufficient force to hold the file in fixed position during the jointing operation.

The screw 8 is operated and controlled by means of a knurled thumb screw or nut 20, which is seated in a cavity 21, between the cross bar 10 and parts of the frame 1, a locking nut 22 also being positioned in said cavity for locking the thumb screw in fixed position, when properly adjusted. The circular or peripheral face of the screw 20 is provided with a graduated scale 23, in this instance each graduation mark representing one one-thousandths of an inch, and supposing ten one-thousandths of an inch are to be removed from the drag teeth 5, the thumb screw 20 is rotated in the direction to move the block 7 inwardly, from "0" until the graduation marked "10" on the periphery of the thumb screw registers with the score line 24 on a part of the frame 1. The lock nut 22 is then operated to lock the thumb screw 20 against further rotation, thus holding the parts in fixed adjusted position. The tool is then placed over the saw as indicated in Fig. 2 of the drawing and a file passed over the protruding portions of the raker tooth 5 until the tooth is reduced to a level with the ribs 15 on the plate 11, thus removing exactly ten one-thousandths of an inch from the tooth.

After the tooth 5 has been filed down as described, it is pointed in the usual manner and the pointed ends of the tooth swaged to adapt it for use with the particular class of timber being sawed and in order to swage the teeth to exactly the same length, a stud 25 is threaded through a bracket 26, mounted on the frame 1, and on the opposite side thereof from the block 7. The outer end of the stud 25 is provided with a knurled head 27, below which is formed an enlarged circular portion 28 on which is placed graduation marks 29, which are likewise graduated to the thousandth of an inch and by turning the stud 25 until the proper graduation mark on the enlarged portion 28 registers with a score line 30 on the bracket 26, the accuracy of the swaging of the teeth 5 may be instantly determined by inserting the teeth, one at a time, below the stud 25. If the raker teeth have been properly swaged, the pointed ends of the tooth will accurately register with the end of the stud, as shown in Fig. 3 of the drawing.

The circular portion 28 of the stud enters a sleeve 31 projecting from the bracket 26, and in said sleeve is placed a spring 32, or similar device, which presses against the bottom of the circular portion 28, thus holding the stud 25 against casual rotation, after the stud is once set. It will be understood, of course, that any other suitable means may be provided for locking the stud against casual rotation.

In operating this form of tool, the file 18 is entered between the ledge 19 and the inner face of the block 7, and the thumb nut 20 operated to impinge the file against the ledge. The file and tool are then placed over the teeth of the saw as shown in Fig. 1 of the drawing and moved lengthwise back and forth, until all the teeth are reduced to a common level.

The file is then removed and the block returned to its initial or zero point and after the length to which the raker teeth 5 are to be cut, has been determined, this amount being regulated by the hardness or softness of the timber to be sawed, the thumb nut 20 is rotated to the right (looking at Fig. 2) until the graduation mark determined upon has been turned to the score line 24 on the frame 1. As previously stated, supposing ten one-thousandth of an inch is to be removed from the raker teeth 5, the thumb nut 20 is rotated until the graduation mark "10" thereon registers with the score line 24, when, by placing the tool over each succeeding raker tooth and filing the outer end thereof off even with the tops of the ribs 15, exactly ten one-thousandth of an inch will have been removed from each tooth.

The swaging operation is then performed on the teeth 5, which may be accomplished in the usual or any preferred manner, and each point of the raker tooth is swaged to the same accuracy by setting the stud 25 to determine to the thousandth part of an inch just how much each prong of the tooth 5 must be swaged to give a uniform swage to all the raker teeth.

By constructing the frame in substantially skeleton formation, the operator may have a more or less clear vision of the work being done and as the parts contacting with the teeth of the saw, also the file, when being used to file down the drag teeth, are made of exceptionally hard material they will not become injured or worn, and neither will the teeth be dulled by coming in contact therewith. The frame proper is preferably constructed of some light material, such as aluminum or the like, thus very materially reducing the weight of the tool without detracting from its stability and wearing qualities, as all contacting parts are made of hardened material to guard against wear.

It will further be seen that the device can be manufactured at a minimum cost and when the parts are properly set and applied to use, the teeth of the saw may be accurately treated and cut down and swaged to the thousandth part of an inch, each succeeding operation being the same as the preceding one and this work may be accomplished by a novice as well as one skilled in the art.

What I claim is:

1. A tool for regulating the filing of saw teeth, comprising a frame having a recess and cavity therein, a block slidable in said recess, an adjusting screw attached to said block and projecting through said cavity, a thumb nut on the screw and located in said cavity for adjusting said block inwardly or outwardly, said nut having graduations on its periphery adapted to cooperate with a score line on said frame whereby it may be accurately and instantly determined when said block has been adjusted to different fractional parts of an inch, and a lock nut also located in said cavity adjacent said thumb nut for locking said thumb nut against casual rotation when properly adjusted.

2. A tool for regulating the filing or cutting down of the raker teeth of a saw comprising a frame, a block slidable in the frame, a screw attached to said block, a thumb nut on said screw having graduations on the periphery thereof adapted to cooperate with a score line on the frame for accurately and instantly determining the adjusted position of said block, a plate attached to said block and projecting beyond one face thereof, said projecting portion having a slot through which the raker tooth is extended when the end of the tooth is to be filed off, a flange at each end of said plate forming a guide for a file moving thereover, and ribs on the plate impervious to the action of a file for limiting the filing operation.

3. A tool for regulating the filing of saw teeth, comprising a frame having a recess at its longitudinal center and extending inwardly from one edge and one face thereof, an adjustable block having a pair of bores therethrough, a pair of posts attached to said frame in said recess and extending through said bores for guiding the block, and means for accurately and instantaneously indicating when said block has been adjusted to thousandths of an inch.

4. A tool for regulating the filing of saw teeth, comprising a frame having a recess substantially at its longitudinal center, said recess extending inwardly from one edge and one face of the frame, said frame also having a cavity extending transversely therethrough between the recess and the opposite edge of the frame, a block slidable in said recess, means attached to the bottom wall of the recess for guiding said block, a threaded adjusting screw projecting through said cavity and the contiguous walls thereof and threaded into said block, means for locking the block in fixed engagement with said screw, a thumb nut threaded onto said adjusting screw and located within said cavity, said thumb nut having graduations thereon, and a locking nut also on said adjusting screw and within said cavity.

5. A tool for regulating the filing of saw teeth, comprising a frame having a lateral cavity therethrough, a block slidably mounted on said frame in juxtaposition to said cavity, an adjusting screw passing freely through the walls of said cavity and through said cavity, means for fixing said block to one end portion of said adjusting screw, a thumb nut threaded onto said adjusting screw and within said cavity and adapted to press against one wall thereof, and a locking nut also threaded onto said adjusting screw and within said cavity, said locking nut being adapted to be turned against the opposite wall of said cavity for locking the thumb nut against rotation and be moved into juxtaposition to said thumb nut when said thumb nut is to be operated to adjust the block.

In testimony whereof I hereto affix my signature.

JOHN A. ST. CLAIR.